US007149883B1

(12) United States Patent
Hammarlund et al.

(10) Patent No.: US 7,149,883 B1
(45) Date of Patent: Dec. 12, 2006

(54) METHOD AND APPARATUS SELECTIVELY TO ADVANCE A WRITE POINTER FOR A QUEUE BASED ON THE INDICATED VALIDITY OR INVALIDITY OF AN INSTRUCTION STORED WITHIN THE QUEUE

(75) Inventors: Per Hammarlund, Hillsboro, OR (US); Robert Krick, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,734

(22) Filed: Mar. 30, 2000

(51) Int. Cl.
*G06F 9/00* (2006.01)
(52) U.S. Cl. .................................... 712/245
(58) Field of Classification Search ............. 712/245, 712/205, 206, 207, 200, 220, 231
See application file for complete search history.

(56) References Cited

U.S. PATENT DOCUMENTS

| | | | |
|---|---|---|---|
| 4,682,284 A | | 7/1987 | Schrofer |
| 4,841,476 A | * | 6/1989 | Mitchell et al. ............. 703/26 |
| 5,954,815 A | | 9/1999 | Joshi et al. |
| 6,014,742 A | | 1/2000 | Krick et al. |
| 6,094,729 A | | 7/2000 | Mann |
| 6,237,074 B1 | * | 5/2001 | Phillips et al. ............. 711/213 |
| 6,477,562 B1 | * | 11/2002 | Nemirovsky et al. ....... 709/108 |
| 6,704,856 B1 | * | 3/2004 | Farrell et al. ............. 712/215 |

FOREIGN PATENT DOCUMENTS

| | | |
|---|---|---|
| EP | 0458305 A2 | 11/1991 |
| EP | 0690373 A1 | 1/1996 |
| WO | WO 93/01545 | 1/1993 |
| WO | WO 93/17385 | 9/1993 |
| WO | WO 96/37829 | 11/1996 |
| WO | WO 96/37831 | 11/1996 |

OTHER PUBLICATIONS

Graf, Rudolf F. Modern Dictionary of Electronics. 1984. Howard W. Sams and Company. Sixth Edition. p. 620.*
"A 100-MHZ Macropiplined Vax Microprocessor", Roy W. Bandeau, et al., *IEEE Journal of Solid-State Circuits*, Nov. 1, 1992, vol. 27, No. 11, pp. 1589-1596.
"Optimization of Instruction Fetch Mechanism for High Issue Rates", Thomas M. Conte, et al., *Proceedings of the Annual Synmposium on Computer Architecture*, Jun. 22, 1995, vol. SYMP 22, pp. 333-344.
Search Report PCT/US 01/08104, Aug. 30, 2001.
Written Opinion-PCT/US01/08104, Feb. 4, 2002.

\* cited by examiner

*Primary Examiner*—Eddie Chan
*Assistant Examiner*—David J. Huisman
(74) *Attorney, Agent, or Firm*—Blakely, Sokoloff, Taylor & Zafman LLP

(57) ABSTRACT

A buffer mechanism for buffering microinstructions between a trace cache and an allocator performs a compacting operation by overwriting entries within a queue, known not to store valid instructions or data, with valid instructions or data. Following a write operation to a queue included within the buffer mechanism, pointer logic determines whether the entries to which instructions or data have been written include the valid data or instructions. If an entry is shown to be invalid, the write pointer is not advanced past the relevant entry. In this way, an immediately following write operation will overwrite the invalid data or instruction with data or instruction. The overwriting instruction or data will again be subject to scrutiny (e.g., a qualitative determination) to determine whether it is valid or invalid, and will only be retained within the queue if valid.

17 Claims, 11 Drawing Sheets

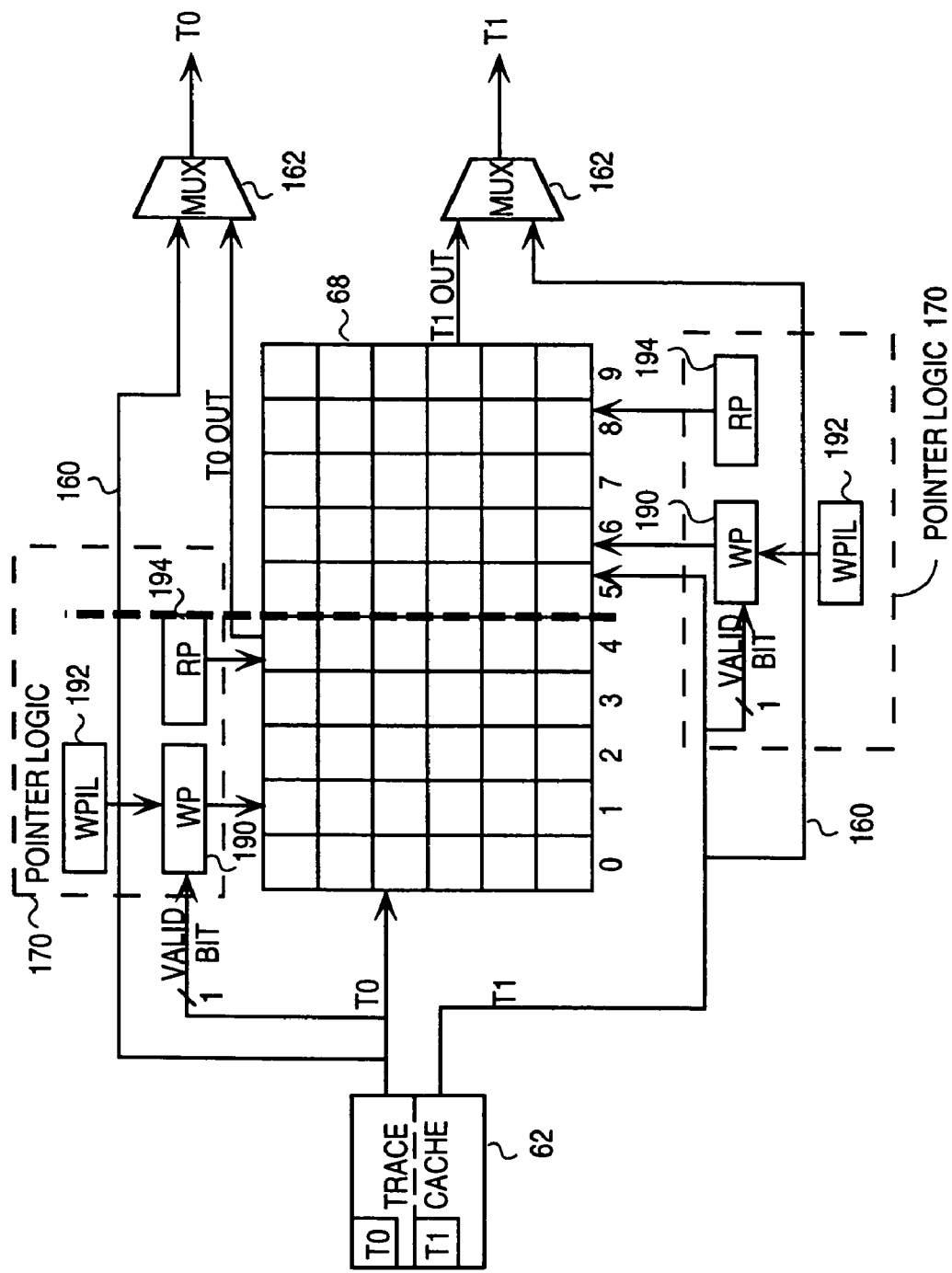

METHOD AND APPARATUS SELECTIVELY TO ADVANCE A WRITE POINTER FOR A QUEUE BASED ON THE INDICATED VALIDITY OR INVALIDITY OF AN INSTRUCTION STORED WITHIN THE QUEUE

FIELD OF THE INVENTION

The present invention relates generally to the field of processors and, more specifically, to a method and apparatus for writing to a queue within a processor pipeline.

BACKGROUND OF THE INVENTION

Buffers, for example in the form of First-In-First-Out (FIFO) queues, are typically used to decouple a source and destination of instructions and/or data, so as to compensate for differences in the delivery rate of a source and the consumption rate of a destination. Within the context of processors (e.g., microprocessors), such buffers are employed at multiple locations between functional units within such processors. Buffers are particularly useful where the output rate of a source functional unit is potentially higher than the consumption rate of a destination functional unit as a result of differences in the output bandwidth and input bandwidth of the source and destination functional units respectively. Further, buffers may be usefully deployed at the point where a source functional unit is clocked at a different speed to a destination functional unit.

Multi-threaded processor design has recently been considered as an increasingly attractive option for increasing the performance of processors. Multithreading within a processor, inter alia, provides the potential for more effective utilization of various processor resources, and particularly for more effective utilization of the execution logic within a processor. Specifically, by feeding multiple threads to the execution logic of a processor, clock cycles that would otherwise have been idle due to a stall or other delay in the processing of a particular thread may be utilized to service a further thread. A stall in the processing of a particular thread may result from a number of occurrences within a processor pipeline. For example, a cache miss or a branch misprediction (i.e., a long-latency operation) for an instruction included within a thread typically results in the processing of the relevant thread stalling. The negative effect of long-latency operations on execution logic efficiencies is exacerbated by the recent increases in execution logic throughput that have outstripped advances in memory access and retrieval rates.

Multi-threaded computer applications are also becoming increasingly common in view of the support provided to such multi-threaded applications by a number of popular operating systems, such as the Windows NT® and Unix operating systems. Multi-threaded computer applications are particularly efficient in the multi-media arena.

BRIEF DESCRIPTION OF THE DRAWINGS

The present invention is illustrated by way of example and not limitation in the figures of the accompanying drawings, in which like references indicate similar elements and in which:

FIG. 11 is a block diagram illustrating architectural details of an alternative embodiment of the microsequencer uop queue illustrated in FIG. 7, as employed within a multi-threaded processor.

DETAILED DESCRIPTION

A method and apparatus for writing to a queue are described. In the following description, for purposes of explanation, numerous specific details are set forth in order to provide a thorough understanding of the present invention. It will be evident, however, to one skilled in the art that the present invention may be practiced without these specific details.

For the purposes of the present specification, the term "processor" shall be taken to refer to any machine that is capable of executing a sequence of instructions (e.g., macro- or micro-instructions), and shall be taken to include, but not be limited to, general purpose microprocessors, special purpose microprocessors, graphics controllers, audio controllers, multi-media controllers and microcontrollers. Further, the term "processor" shall be taken to refer to, inter alia, Complex Instruction Set Computers (CISC), Reduced Instruction Set Computers (RISC), or Very Long Instruction Word (VLIW) processors.

For the purposes of the present specification, the term "resource" shall be taken to include any unit, component or module of a processor or a computer system, and shall be taken to include, but not be limited to, a memory resource, a processing resource, a buffering resource, a communications resource or bus, a sequencing resource or a translating resource.

Processor Pipeline

Figure 1:
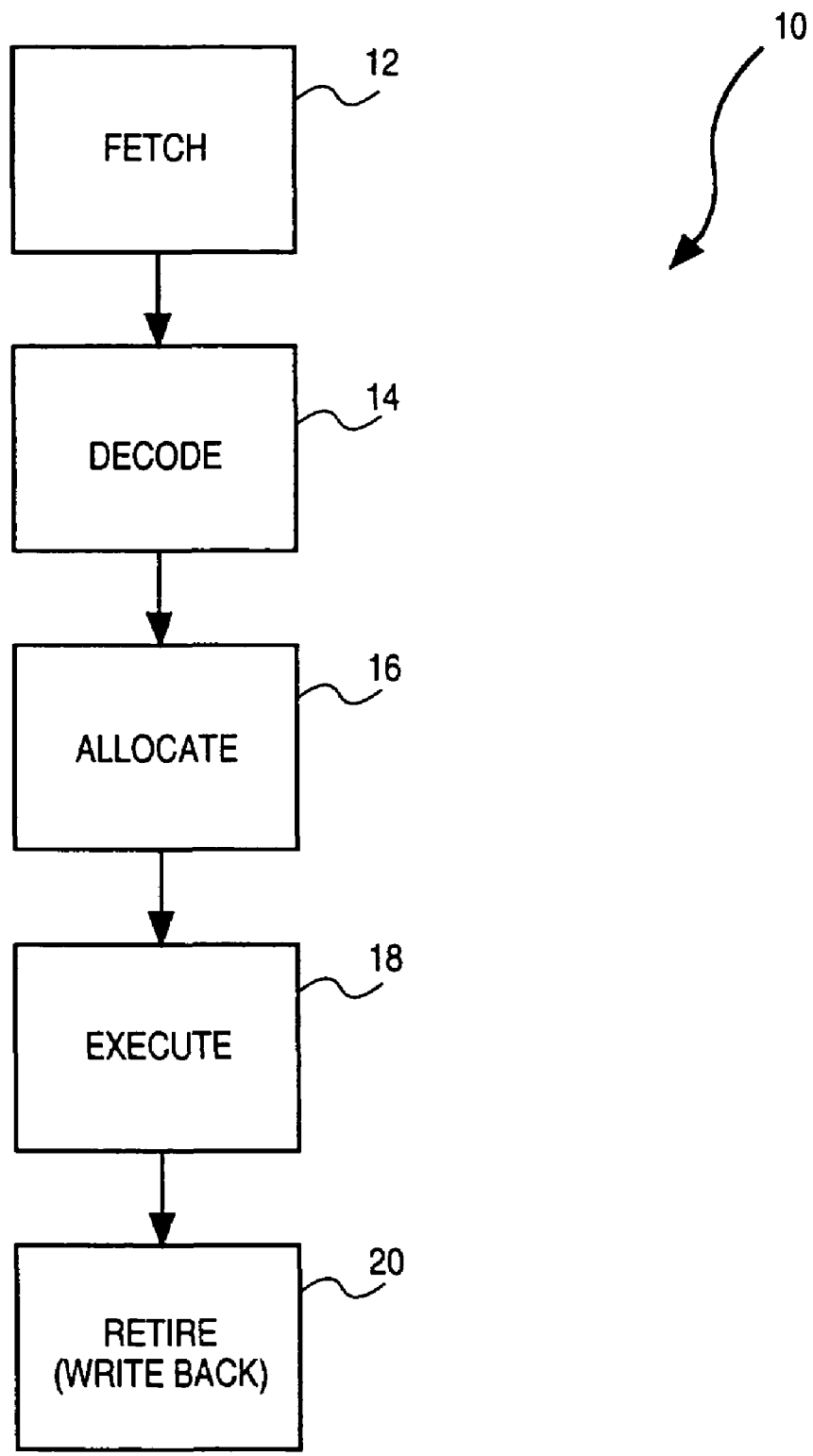
FIG. 1 is a block diagram illustrating an exemplary pipeline of a processor within which the present invention may be implemented.

FIG. 1 is a high-level block diagram illustrating an exemplary embodiment of processor pipeline 10 within which the present invention may be implemented. The pipeline 10 includes a number of pipe stages, commencing with a fetch pipe stage 12 at which instructions (e.g., macroinstructions) are retrieved and fed into the pipeline 10. For example, a macroinstruction may be retrieved from a cache memory that is integral with the processor, or closely associated therewith, or may be retrieved from an external main memory via a processor bus. From the fetch pipe stage 12, the macroinstructions are propagated to a decode pipe stage 14, where macroinstructions are translated into microinstructions (also termed "microcode") suitable for execution within the processor. The microinstructions are then propagated downstream to an allocate pipe stage 16, where processor resources are allocated to the various microinstructions according to availability and need. The microinstructions are then executed at an execute stage 18 before being retired, or "written-back" (e.g., committed to an architectural state) at a retire pipe stage 20.

Microprocessor Architecture

Figure 2:
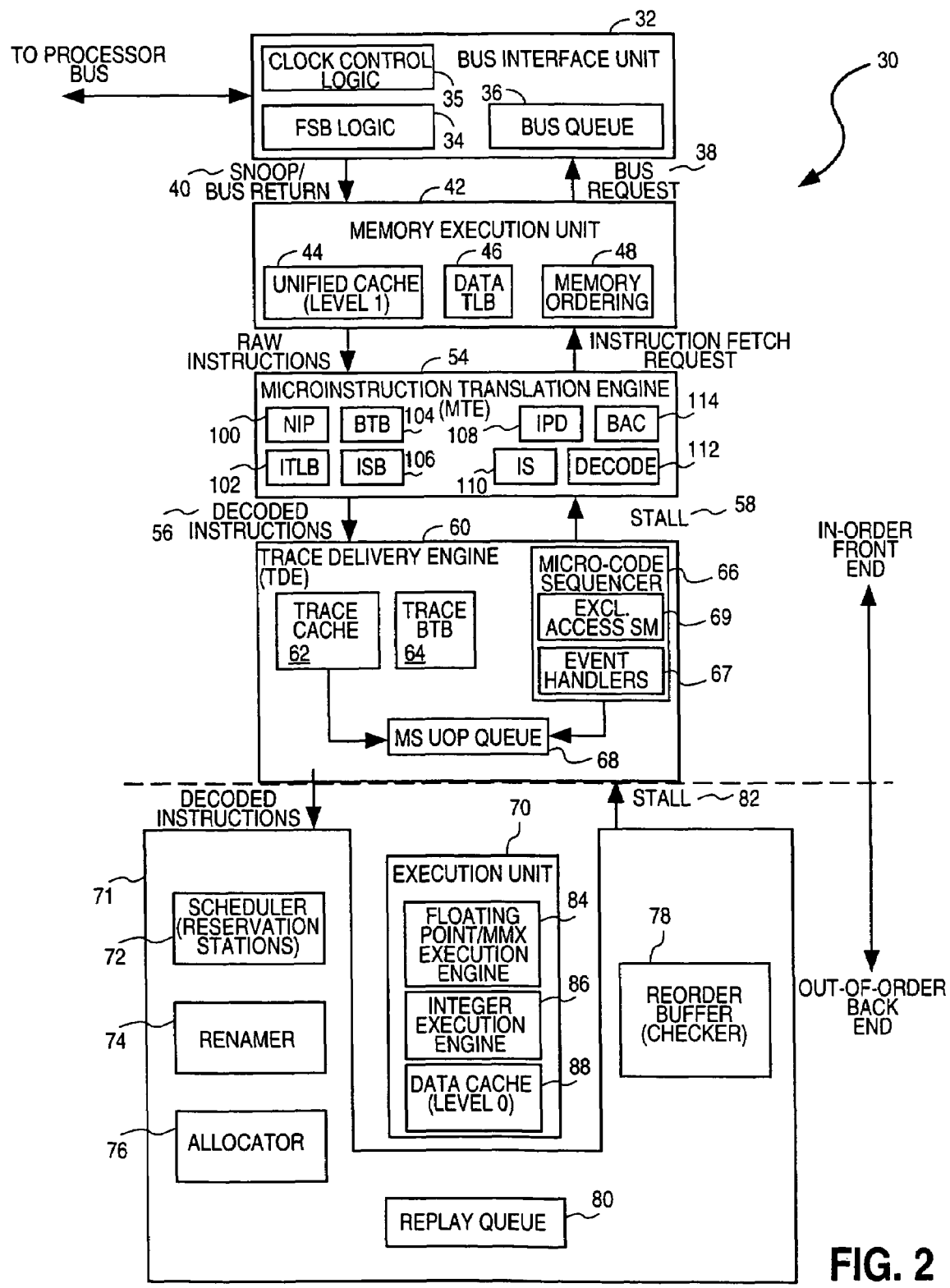
FIG. 2 is a block diagram illustrating an exemplary embodiment of a processor, in the form of a general-purpose multi-threaded microprocessor, within which the present invention may be implemented.

FIG. 2 is a block diagram illustrating an exemplary embodiment of a processor 30, in the form of a general-purpose microprocessor, within which the present invention may be implemented. The processor 30 is described below as being a multi-threaded (MT) processor, and is accordingly able simultaneously to process multiple instruction threads (or contexts). However, a number of the teachings provided below in the specification are not specific to a multi-threaded processor, and may find application in a single threaded processor. In an exemplary embodiment, the processor 30 may comprise an Intel Architecture (IA) microprocessor that is capable of executing the Intel Architecture instruction set. An example of such an Intel Architecture microprocessor is the Pentium Pro® microprocessor or the Pentium III® microprocessor manufactured by Intel Corporation of Santa Clara, Calif.

The processor 30 comprises an in-order front end and an out-of-order back end. The in-order front end includes a bus interface unit 32, which functions as the conduit between the processor 30 and other components (e.g., main memory) of a computer system within which the processor 30 may be employed. To this end, the bus interface unit 32 couples the processor 30 to a processor bus (not shown) via which data and control information may be received at and propagated from the processor 30. The bus interface unit 32 includes Front Side Bus (FSB) logic 34 that controls communications over the processor bus. The bus interface unit 32 further includes a bus queue 36 that provides a buffering function with respect to communications over the processor bus. The bus interface unit 32 is shown to receive bus requests 38 from, and to send snoops or bus returns 40 to, a memory execution unit 42 that provides a local memory capability within the processor 30. The memory execution unit 42 includes a unified data and instruction cache 44, a data Translation Lookaside Buffer (TLB) 46, and memory ordering buffer 48. The memory execution unit 42 receives instruction fetch requests 50 from, and delivers raw instructions 52 (i.e., coded macroinstructions) to, a microinstruction translation engine 54 that translates the received macroinstructions into a corresponding set of microinstructions.

The microinstruction translation engine 54 effectively operates as a trace cache "miss handler" in that it operates to deliver microinstructions to a trace cache 62 in the event of a trace cache miss. To this end, the microinstruction translation engine 54 functions to provide the fetch and decode pipe stages 12 and 14 in the event of a trace cache miss. The microinstruction translation engine 54 is shown to include a next instruction pointer (NIP) 100, an instruction Translation Lookaside Buffer (TLB) 102, a branch predictor 104, an instruction streaming buffer 106, an instruction pre-decoder 108, instruction steering logic 110, an instruction decoder 112, and a branch address calculator 114. The next instruction pointer 100, TLB 102, branch predictor 104 and instruction streaming buffer 106 together constitute a branch prediction unit (BPU) 99. The instruction decoder 112 and branch address calculator 114 together comprise an instruction translate (IX) unit 113.

The next instruction pointer 100 issues next instruction requests to the unified cache 44. In the exemplary embodiment where the processor 30 comprises a multi-threaded microprocessor capable of processing two threads, the next instruction pointer 100 may include a multiplexer (MUX) (not shown) that selects between instruction pointers associated with either the first or second thread for inclusion within the next instruction request issued therefrom. In one embodiment, the next instruction pointer 100 will interleave next instruction requests for the first and second threads on a cycle-by-cycle ("ping pong") basis, assuming instructions for both threads have been requested, and instruction streaming buffer 106 resources for both of the threads have not been exhausted. The next instruction pointer requests may be for either 16, 32 or 64-bytes depending on whether the initial request address is in the upper half of a 32-byte or 64-byte aligned line. The next instruction pointer 100 may be redirected by the branch predictor 104, the branch address calculator 114 or by the trace cache 62, with a trace cache miss request being the highest priority redirection request.

When the next instruction pointer 100 makes an instruction request to the unified cache 44, it generates a two-bit "request identifier" that is associated with the instruction request and functions as a "tag" for the relevant instruction request. When returning data responsive to an instruction request, the unified cache 44 returns the following tags or identifiers together with the data:

1. The "request identifier" supplied by the next instruction pointer 100;
2. A three-bit "chunk identifier" that identifies the chunk returned; and
3. A "thread identifier" that identifies the thread to which the returned data belongs.

Next instruction requests are propagated from the next instruction pointer 100 to the instruction TLB 102, which performs an address lookup operation, and delivers a physical address to the unified cache 44. The unified cache 44 delivers a corresponding macroinstruction to the instruction streaming buffer 106. Each next instruction request is also propagated directly from the next instruction pointer 100 to the instruction streaming buffer 106 so as to allow the instruction streaming buffer 106 to identify the thread to which a macroinstruction received from the unified cache 44 belongs. The macroinstructions from both first and second threads are then issued from the instruction streaming buffer 106 to the instruction pre-decoder 108, which performs a number of length calculation and byte marking operations with respect to a received instruction stream (of macroinstructions). Specifically, the instruction pre-decoder 108 generates a series of byte marking vectors that serve, inter alia, to demarcate macroinstructions within the instruction stream propagated to the instruction steering logic 110.

The instruction steering logic 110 then utilizes the byte marking vectors to steer discrete macroinstructions to the instruction decoder 112 for the purposes of decoding. Macroinstructions are also propagated from the instruction steering logic 110 to the branch address calculator 114 for the purposes of branch address calculation. Microinstructions are then delivered from the instruction decoder 112 to the trace delivery engine 60.

During decoding, flow markers are associated with each microinstruction. A flow marker indicates a characteristic of the associated microinstruction and may, for example, indicate the associated microinstruction as being the first or last microinstruction in a microcode sequence representing a macroinstruction. The flow markers include a "beginning of macroinstruction" (BOM) and an "end of macroinstruction" (EOM) flow markers. According to the present invention, the decoder 112 may further decode the microinstructions to have shared resource (multiprocessor) (SHRMP) flow markers and synchronization (SYNC) flow markers associated therewith. Specifically, a shared resource flow marker identifies a microinstruction as a location within a particular thread at which the thread may be interrupted (e.g., restarted or paused) with less negative consequences than elsewhere in the thread. The decoder 112, in an exemplary embodiment of the present invention, is constructed to mark microinstructions that comprise the end or the beginning of a parent macroinstruction with a shared resource flow marker. A synchronization flow market identifies a microinstruction as a location within a particular thread at which the thread may be synchronized with another thread responsive to, for example, a synchronization instruction within the other thread.

From the microinstruction translation engine 54, decoded instructions (i.e., microinstructions) are sent to a trace delivery engine 60. The trace delivery engine 60 includes the trace cache 62, a trace branch predictor (BTB) 64, a microcode sequencer 66 and a microcode (uop) queue 68. The trace delivery engine 60 functions as a microinstruction cache, and is the primary source of microinstructions for a downstream execution unit 70. By providing a microinstruction caching function within the processor pipeline, the trace delivery engine 60, and specifically the trace cache 62, allows translation work done by the microinstruction translation engine 54 to be leveraged to provide an increased microinstruction bandwidth. In one exemplary embodiment, the trace cache 62 may comprise a 256 set, 8 way set associate memory. The term "trace", in the present exemplary embodiment, may refer to a sequence of microinstructions stored within entries of the trace cache 62, each entry including pointers to preceding and proceeding microinstructions comprising the trace. In this way, the trace cache 62 facilitates high-performance sequencing in that the address of the next entry to be accessed for the purposes of obtaining a subsequent microinstruction is known before a current access is complete. Traces may be viewed as "blocks" of instructions that are distinguished from one another by trace heads, and are terminated upon encountering an indirect branch or by reaching one of many present threshold conditions, such as the number of conditioned branches that may be accommodated in a single trace or the maximum number of total microinstructions that may comprise a trace. The trace cache branch prediction unit 64 provides local branch predictions pertaining to traces within the trace cache 62. The trace cache 62 and the microcode sequencer 66 provide microinstructions to the microcode queue 68, from where the microinstructions are then fed to an out-of-order execution cluster. The microcode sequencer 66 furthermore includes a number of event handlers embodied in microcode, that implement a number of operations within the processor 30 in response to the occurrence of an event such as an exception or an interrupt. The event handlers 67 are invoked by an event detector (not shown) included within a register renamer 74 in the back end of the processor 30.

The processor 30 may be viewed as having an in-order front-end, comprising the bus interface unit 32, the memory execution unit 42, the microinstruction translation engine 54 and the trace delivery engine 60, and an out-of-order back-end that will be described in detail below.

Microinstructions dispatched from the microcode queue 68 are received into an out-of-order cluster 71 comprising a scheduler 72, the register renamer 74, an allocator 76, a reorder buffer 78 and a replay queue 80. The scheduler 72 includes a set of reservation stations, and operates to schedule and dispatch microinstructions for execution by the execution unit 70. The register renamer 74 performs a register renaming function with respect to hidden integer and floating point registers (that may be utilized in place of any of the eight general purpose registers or any of the eight floating-point registers, where a processor 30 executes the Intel Architecture instruction set). The allocator 76 operates to allocate resources of the execution unit 70 and the cluster 71 to microinstructions according to availability and need. In the event that insufficient resources are available to process a microinstruction, the allocator 76 is responsible for asserting a stall signal 82, that is propagated through the trace delivery engine 60 to the microinstruction translation engine 54, as shown at 58. Microinstructions, which have had their source fields adjusted by the register renamer 74, are placed in a reorder buffer 78 in strict program order. When microinstructions within the reorder buffer 78 have completed execution and are ready for retirement, they are then removed from the reorder buffer 78. The replay queue 80 propagates microinstructions that are to be replayed to the execution unit 70.

The execution unit 70 is shown to include a floating-point execution engine 84, an integer execution engine 86, and a level 0 data cache 88. In one exemplary embodiment in which is the processor 30 executes the Intel Architecture instruction set, the floating point execution engine 84 may further execute MMX® instructions.

Multithreading Implementation

In the exemplary embodiment of the processor 30 illustrated in FIG. 2, there may be limited duplication or replication of resources to support a multithreading capability, and it is accordingly necessary to implement some degree of resource sharing between threads. The resource sharing scheme employed, it will be appreciated, is dependent upon the number of threads that the processor is able simultaneously to process. As functional units within a processor typically provide some buffering (or storage) functionality and propagation functionality, the issue of resource sharing may be viewed as comprising (1) storage and (2) processing/propagating bandwidth sharing components. For example, in a processor that supports the simultaneous processing of two threads, buffer resources within various functional units may be statically or logically partitioned between two threads. Similarly, the bandwidth provided by a path for the propagation of information between two functional units must be divided and allocated between the two threads. As these resource sharing issues may arise at a number of locations within a processor pipeline, different resource sharing schemes may be employed at these various locations in accordance with the dictates and characteristics of the specific location. It will be appreciated that different resource sharing schemes may be suited to different locations in view of varying functionalities and operating characteristics.

Figure 3:
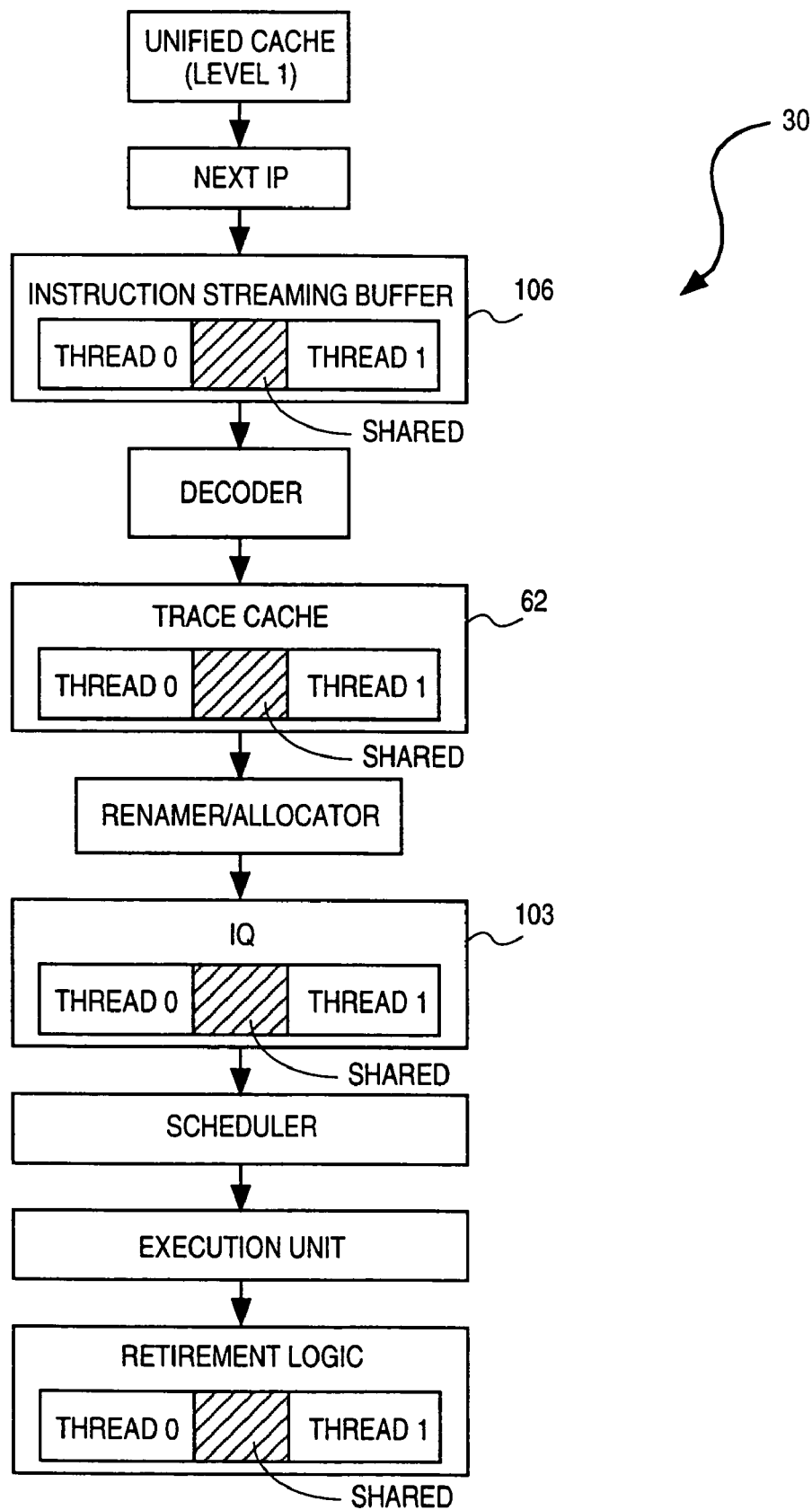
FIG. 3 is a block diagram illustrating selected components of an exemplary multi-threaded microprocessor, and specifically depicts various functional units that provide a buffering (or storage) capability as being logically partitioned to accommodate multiple thread.

FIG. 3 is a block diagram illustrating selected components of the processor 30 illustrated in FIG. 2, and depicts various functional units that provide a buffering capability as being logically partitioned to accommodate two threads (i.e., thread 0 and thread 1). The logical partitioning for two threads of the buffering (or storage) and processing facilities of a functional unit may be achieved by allocating a first predetermined set of entries within a buffering resource to a first thread and allocating a second predetermined set of entries within the buffering resource to a second thread. Specifically, this may be achieved by providing two pairs of read and write pointers, a first pair of read and write pointers being associated with a first thread and a second pair of read and write pointers being associated with a second thread. The first set of read and write pointers may be limited to a first predetermined number of entries within a buffering resource, while the second set of read and write pointers may be limited to a second predetermined number of entries within the same buffering resource. In the exemplary embodiment, the instruction streaming buffer 106, the trace cache 62, and an instruction queue 103 are shown to each provide a storage capacity that is logically partitioned between the first and second threads. Each of these units is also sown to include a "shared" capacity that may, according to respective embodiments, be dynamically allocated to either the first or the second thread according to certain criteria.

Trace Delivery Engine

One embodiment of the present invention is described below as being implemented within a trace delivery engine 60. However, it will be appreciated that the present invention may be applied to any resources within or associated with a processor, and the trace delivery engine 60 is merely provided as an exemplary embodiment.

As alluded to above, the trace delivery engine 60 may function as a primary source of microinstructions during periods of high performance by providing relatively low latency and high bandwidth. Specifically, for a CISC instruction set, such as the Intel Architecture x86 instruction set, decoding of macroinstructions to deliver microinstructions may introduce a performance bottleneck as the variable length of such instructions complicates parallel decoding operations. The trace delivery engine 60 attempts to address this problem by providing for the caching of microinstructions, thus obviating the need for microinstructions executed by the execution unit 17 to be continually decoded.

To provide high-performance sequencing of cached microinstructions, the trace delivery engine 60 creates sequences of entries (or microinstructions) that may conveniently be labeled "traces". A trace may, in one embodiment, facilitate sequencing in that the address of a subsequent entry can be known during a current access operation, and before a current access operation is complete. In one embodiment, a trace of microinstructions may only be entered through a so-called "head" entry, that includes a linear address that determines a set of subsequent entries of the trace event stored in successive sets, with every entry (except a tail entry) containing a way pointer to a next entry. Similarly, every entry (except a head entry) contains a way pointer to a previous entry.

In one embodiment, the trace delivery engine 60 may implement two modes to either provide input thereto or output therefrom. The trace delivery engine 60 may implement a "build mode" when a miss occurs with respect to a trace cache 62, such a miss being passed on to the microinstruction translation engine 54. In the "build mode", the microinstruction translation engine 54 will then perform a translation operation on a macroinstruction received either from the unified cache 44, or by performing a memory operation via the processor bus. The microinstruction translation engine 54 then provides the microinstructions derived from the macroinstruction(s), to the trace delivery engine 60 that populates the trace cache 62 with these microinstructions.

When a trace cache hit occurs, the trace delivery engine 60 operates in a "stream mode" where a trace, or traces, of microinstructions are fed from the trace delivery engine 60, and specifically the trace cache 62, to the processor back end via the microinstruction queue 68.

Figure 4:
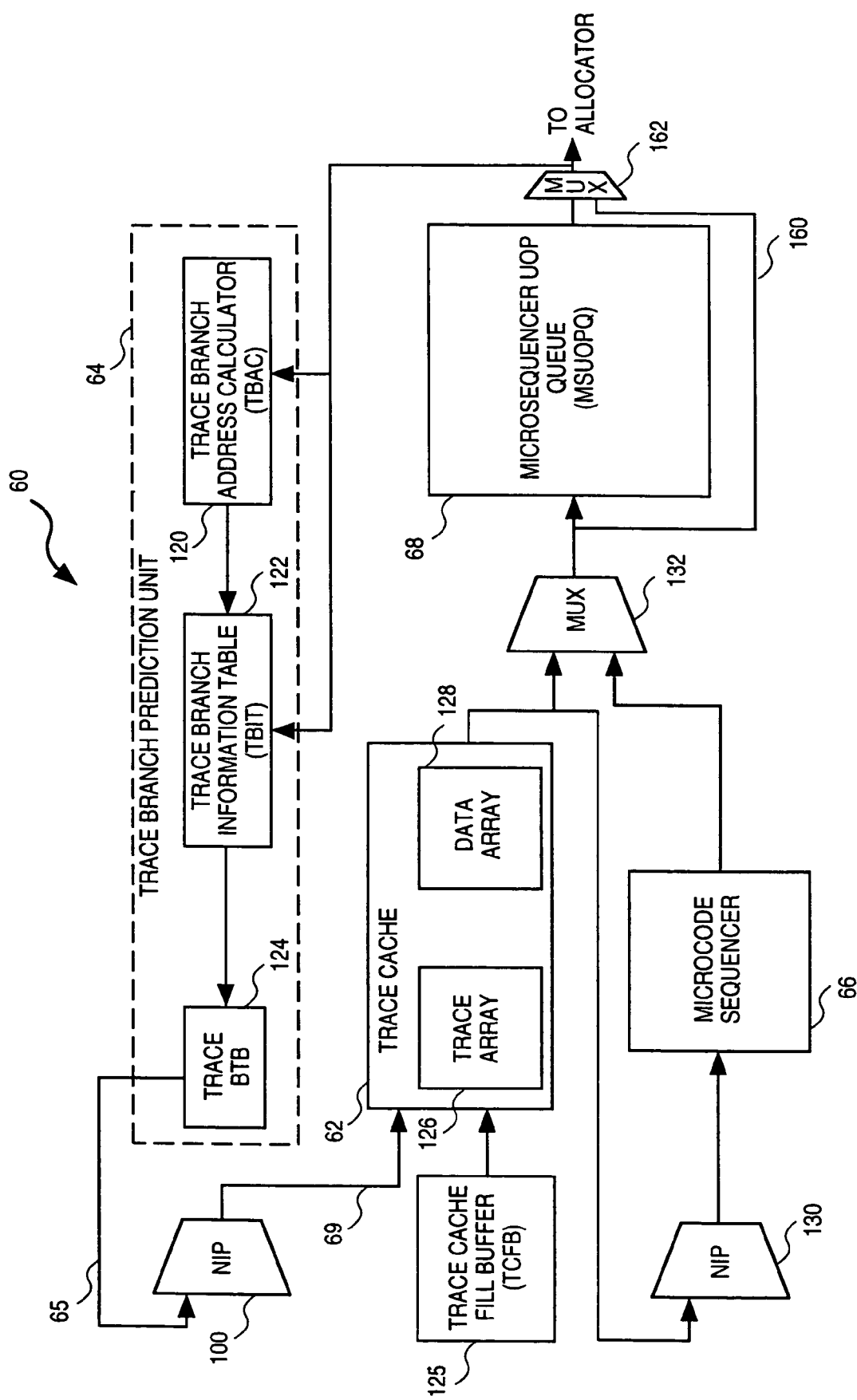
FIG. 4 is a block diagram illustrating architectural details of an exemplary trace delivery engine.

FIG. 4 is a block diagram showing further details regarding the various components of the trace delivery engine (TDE) 60 shown in FIG. 2. The next instruction pointer 100, which forms part of the microinstruction translation engine 54, is shown to receive a prediction output 65 from the trace branch prediction unit 64. The next instruction pointer 100 provides an instruction pointer output 69, which may correspond to the prediction output 65, to the trace cache 62.

A trace branch address calculator (TBAC) 120 monitors the output of the microsequencer uop queue 68, and performs a number of functions to provide output to a trace branch information table 122. Specifically, the trace branch address calculator 120 is responsible for bogus branch detection, the validation of branch target and branch prediction operations, for computing a NLIP (Next Linear Instruction Pointer) for each instruction, and for detecting limit violations for each instruction.

The trace branch information table (TBIT) 122 stores information required to update the trace branch prediction unit 64. The table 122 also holds information for events and, in one embodiment, is hard partitioned to support multi-threading. Of course, in an alternative embodiment, the table 122 may be dynamically partitioned.

The trace branch information table 122 provides input to a trace branch target buffer (trace BTB) 124 that operates to predict "leave trace" conditions and "end-of-trace" branches. To this end, the buffer 124 may operate to invalidate microinstructions.

When operating in the above-mentioned "build mode", microinstructions are received into the trace cache 62 via a trace cache fill buffer (TCFB) 125, which is shown in FIG. 4 to provide input into the trace cache 62.

The trace cache 62 is shown in FIG. 4 to include a data array 128 and an associated tag array 126. The data array 128 provides a storage for, in one embodiment, 12 KB of microinstructions.

The trace cache 62 and the microcode sequencer 66 each provide input to a MUX 132 through which microinstructions are fed to the microsequencer uop queue 68. A "bypass" path 160 is provided in parallel to the queue 68, with both the bypass path 160 and the queue 68 providing input to a further MUX 162. Accordingly, the queue 68 and the bypass path 160 may be viewed, in one embodiment, as comprising first and second paths that feed into the MUX 162, which operates to select output from one of these paths.

Further details regarding the queue 68, the bypass path 160 and the MUX 162 are provided below.

Figure 5:
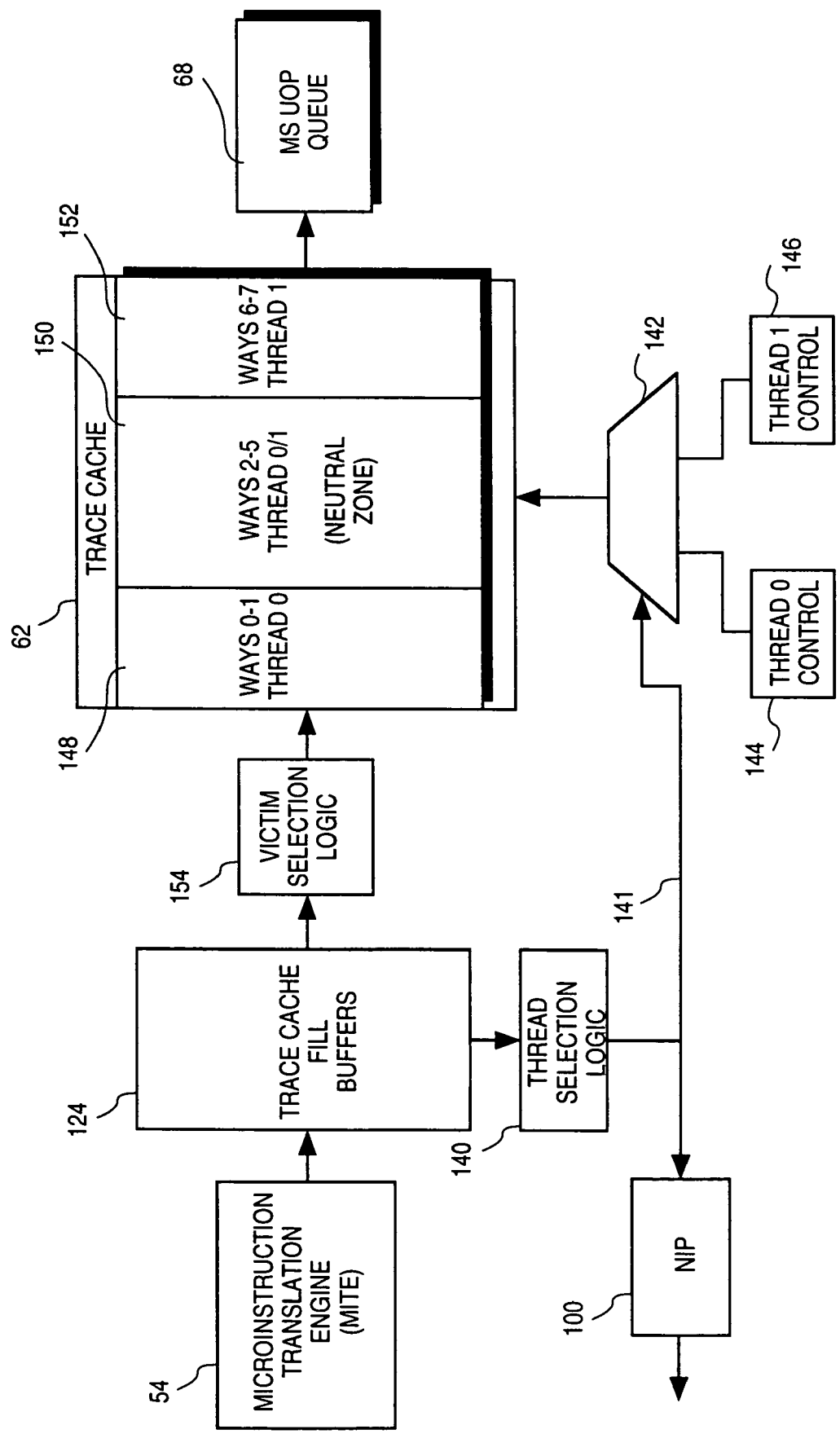
FIG. 5 is a block diagram illustrating architectural details regarding the implementation of an exemplary trace cache within a multi-threaded processor.

FIG. 5 is a block diagram illustrating further architectural details pertinent to the trace cache 62. The thread selection logic 140 implements a thread selection state machine that, in one embodiment, decides on a cycle-by-cycle basis which of multiple threads (e.g., thread 0 or thread 1) is propagated to subsequent pipe stages of a processor 30.

FIG. 5 also illustrates the partitioning of the trace cache 62 into three portions (or sections), namely a first portion 148 dedicated to a first thread, a second portion 152 dedicated to a second thread, and a third portion 150 that is dynamically shared between the first and second threads. In the exemplary embodiment, each of the first and second portions 148 and 152 comprises two (2) ways of the data array 128 (and the associated tag array 126) of the trace cache 62. The third, shared portion 150 constitutes four (4) ways of the data array 128, and the associated tag array 126. The illustrated partitioning of the trace cache 62 is implemented by victim selection logic 154.

Figure 6:
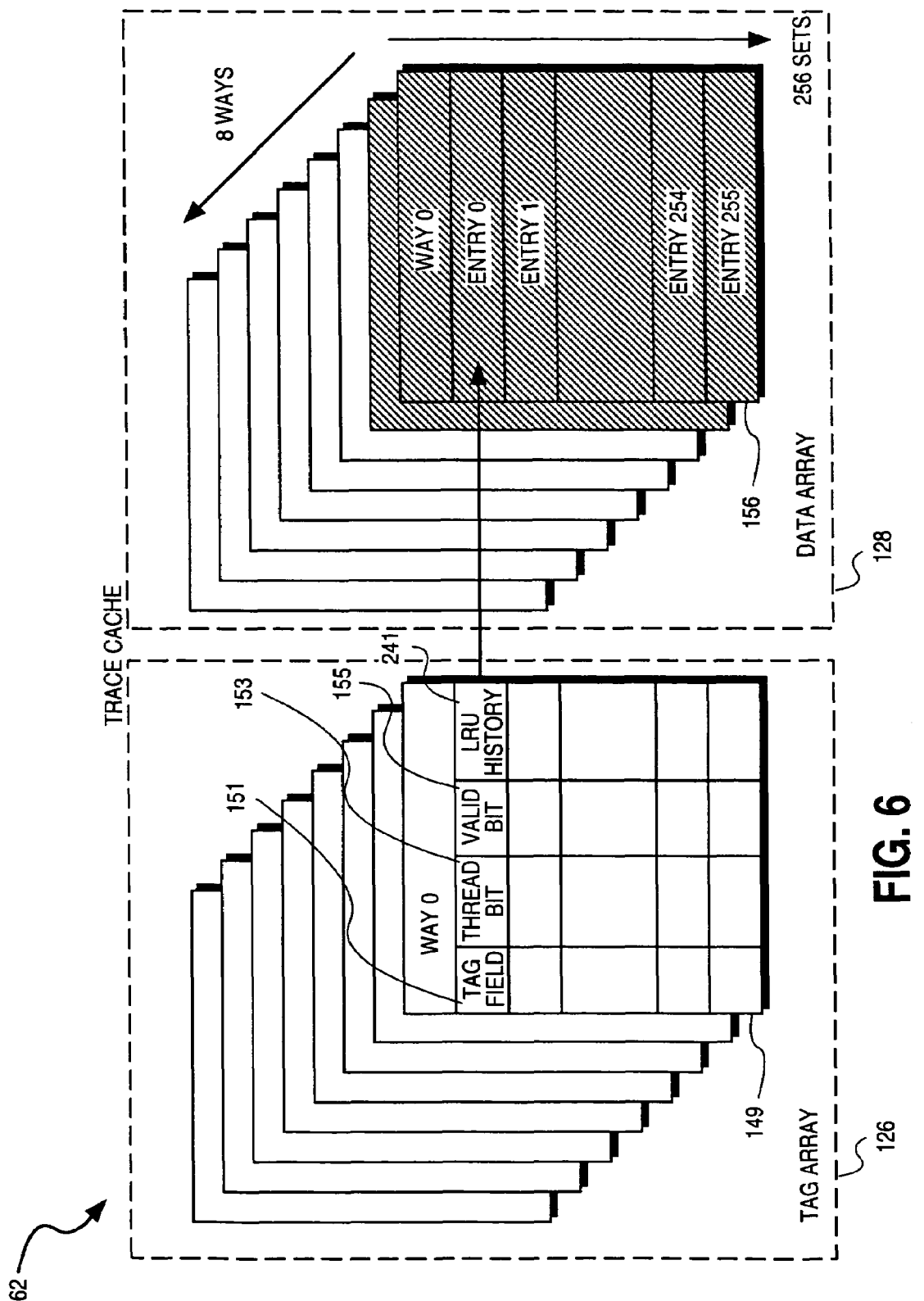
FIG. 6 is a block diagram providing further details regarding the structure and content of an exemplary trace cache, that may be utilized in a multi-threaded processor.

FIG. 6 is a block diagram illustrating an exemplary structure of the trace cache 62, according to one embodiment. Each of the tag array 126 and the data array 128 is shown to comprise an eight-way, set associative arrangement, including 256 sets thus providing a total of 2048 entries within each of the tag and data arrays 126 and 128. Each entry 149 within the tag array 126 is show to store, inter alia, tag field information 151, a thread bit 153, a valid bit 155 and a Least Recently Used (LRU) bit 241 for each corresponding entry 156 within the data array 128. The thread bit 153 marks the data within the associated entry 156 as belonging, for example, to either a first or a second thread. The valid bit 155 marks the data within the corresponding entry 156 of the data array 128 as being valid or invalid.

Microsequencer Uop Queue

Figure 7:
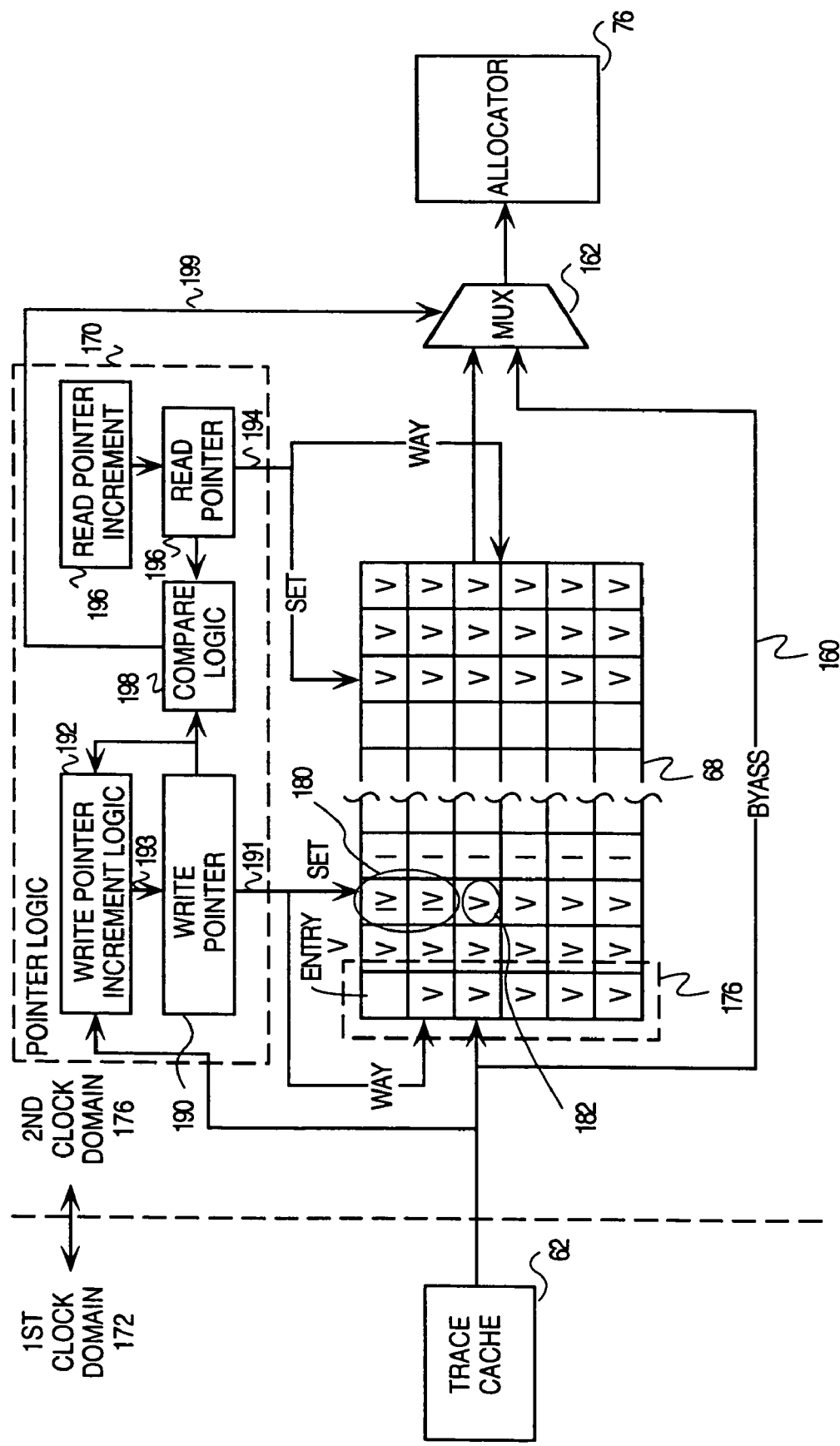
FIG. 7 is a block diagram showing architectural details of an exemplary microsequencer uop queue, and associated pointer logic, according to one embodiment of the present invention.

FIG. 7 is a block diagram illustrating further details regarding an exemplary microsequencer uop queue 68, and associated pointer logic 170. The trace cache 62 is shown to be operating in a first clock domain 172, while the queue 68 and the pointer logic 170 are shown to operate in a second clock domain 174. In an exemplary embodiment, the second clock domain 174 is clocked at twice the speed of the first clock domain 172. However, it will be appreciated that in alternative embodiments, any clocking speed ratio between the first and second clock domains 172 and 174. For example, in one embodiment, a 3:4 clock speed ratio may be implemented.

The trace cache 62, in the exemplary embodiment, furthermore outputs six microinstructions (or uops) per clock cycle of the first clock domain. The allocator 76, however, consumes only three microinstructions (or uops) per clock cycle of the second clock domain. However, as the second clock domain is clocked at twice the frequency of the first clock domain, there is some balance between output of the trace cache 62 and the consumption of the allocator 76.

Nonetheless, the execution units 70 that are fed by the allocator 76 may stall, or in some other way cause a delay in the allocation of microinstructions from the allocator 76 to the execution units 70. Accordingly, consumption of microinstructions by the allocator 76 from the queue 68 may, at certain times, be diminished. In these situations, the queue 68 provides a degree of decoupling between the trace cache 62 and the allocator 76 by allowing the trace cache 62 to continue to output sets of microinstructions, even though consumption by the allocator 76 has temporarily stalled.

Similarly, output from the trace cache 62 may diminish, or be suspended, due to certain events. For example, a trace cache miss requires the retrieval of microinstructions from the microinstruction translation engine 54, in which case output from the trace cache 62 will be stalled. In such situations, the allocator 76 is then afforded the opportunity to empty the queue 68.

As mentioned above, the trace cache 62 outputs 6 uops per clock cycle in the first clock domain, and the exemplary uop queue 68 is accordingly shown to include a plurality of "uop" lines 176, each line 176 including six entries, each entry storing a single microinstruction. In one embodiment, the uop queue 68 may be implemented as a set of associative structure, in which each line is comprised of a set of entries across six ways.

As explained above, microinstructions are written from the trace cache 62 to the microsequencer uop queue 68 in sets of a predetermined size per clock cycle (e.g., 6 uops/cycle), this set of microinstructions populating a uop line 176 of the queue 68. In certain situations, however, only a partial set of microinstructions, or a set of microinstructions containing only a subset of valid microinstructions, may be read from the trace cache 62 and written into a particular uop line 176.

In one embodiment, a particular entry from a uop line 176 of the queue 68 may contain an invalid microinstruction for both static and dynamic reasons. Considering the static scenario first, it will be appreciated that a trace of microinstructions is of a predetermined length (or size). For example, various types of macroinstructions may correspond to traces of microinstructions of varying size. Where the number of microinstructions contained in a specific trace is not a multiple of the size of the predetermined sets communicated from the trace cache 62 to the queue 68 (e.g., six uops) it will be appreciated that, for the tail of the trace, a partial set of microinstructions may be written to a uop line 176 of the queue 68.

Further, as will be come apparent below, the present invention does not require that the writing of a trace of microinstructions commence at a first entity of a uop line 176. It will also be appreciated that there is a high probability that the last microinstruction of the relevant trace will be written to an intermediate entry within a uop line 176.

In summary, as a result of traces having a fixed length, and also as the result of the writing of sets of a predetermined number of microinstructions from the trace cache 62 to the queue 68, "bubbles" of invalid entries may be introduced into the queue 68. By way of example, FIG. 7 indicates entries within the queue 68 that contain valid entries with a "V", whereas invalid entries are indicated with a "IV". Accordingly, as a result of the ending of a trace, a "bubble" of invalid entries is shown to be introduced into the queue 68 at 180.

Bubbles of invalid entries may also be dynamically introduced into the queue 68. For example, where a branch misprediction occurs, microinstructions subsequent to the mispredicted branch are evaluated to be invalid. Accordingly, the "bubble" of invalid entries 180 illustrated in FIG. 7 may also result where the valid instruction 182 comprises a mispredicted branch microinstruction.

One way of handling such bubbles 180 of invalid entries within the queue 68 would simply be to have the allocator 76 ignore such invalid entries when read from the queues 68. In one embodiment, the entries are marked as invalid by a "valid bit" 155 associated with each entry, or a microinstruction, stored within such entry. However, this approach is undesirable in that it consumes a read clock cycle of the allocator 76 for the reading of potentially invalid entries. A further disadvantage is that valuable capacity provided by the queue 68 is consumed by invalid entries. For these reasons, the present invention proposes apparatus and a methodology for removing bubbles of invalid entries (or microinstructions) from the queue 68 by the overwriting of such invalid entries with valid microinstructions.

The apparatus and methodology of the present invention will be discussed below with reference to the exemplary apparatus illustrated in FIGS. 7 and 8, and the exemplary method illustrated in FIG. 9.

Figure 9:
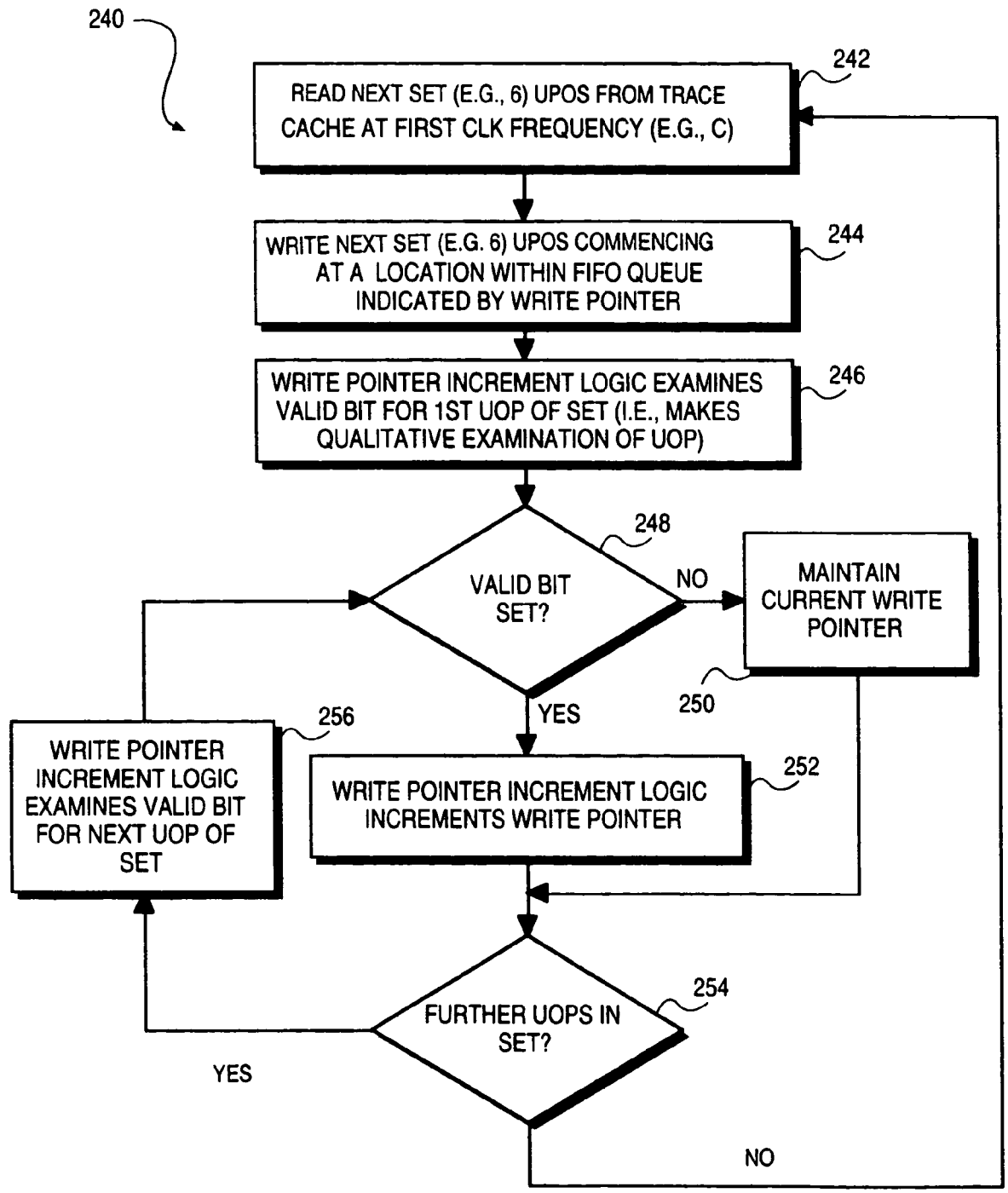
FIG. 9 is a flow chart illustrating a method, according to one embodiment of the present invention, of writing instructions or data to a queue between a source and a destination.

FIG. 9 is a flow chart illustrating an exemplary method 240, according to one embodiment of the present invention, of filling a queue or buffer associated with a processor.

The method 240 commences at block 242 with the reading of a first set of instructions, (e.g., six microinstructions) from the trace cache 62 during a clock cycle of the first clock domain 172.

At block 244, the set of microinstructions is written to a sequential set of entries (i.e., a set of entries) within the microsequencer uop queue 68, commencing at an entry indicated by a write pointer value 191 outputted by write pointer logic 190 of the pointer logic 170. The pointer value 191 may, as illustrated in FIG. 7, identify an entry into which the first microinstruction of the set is to be written by identifying both a way and a set, thus providing the coordinates of the entry.

The method 240 commences to loop through block 246–256 to advance the write pointer 190 to the entry within the queue 68 following the entry of the set containing the last valid microinstruction.

At block 246, write pointer increment logic 192 makes a qualitative determination regarding whether the microinstruction is to be returned (or is of value) by examining the valid bit for the first microinstruction of the set of microinstructions written to the queue at block 244. It will be appreciated that a qualitative examination of the microinstruction could be made in any number of ways and may consider any number of qualitative characteristics of a microinstruction.

Figure 8:
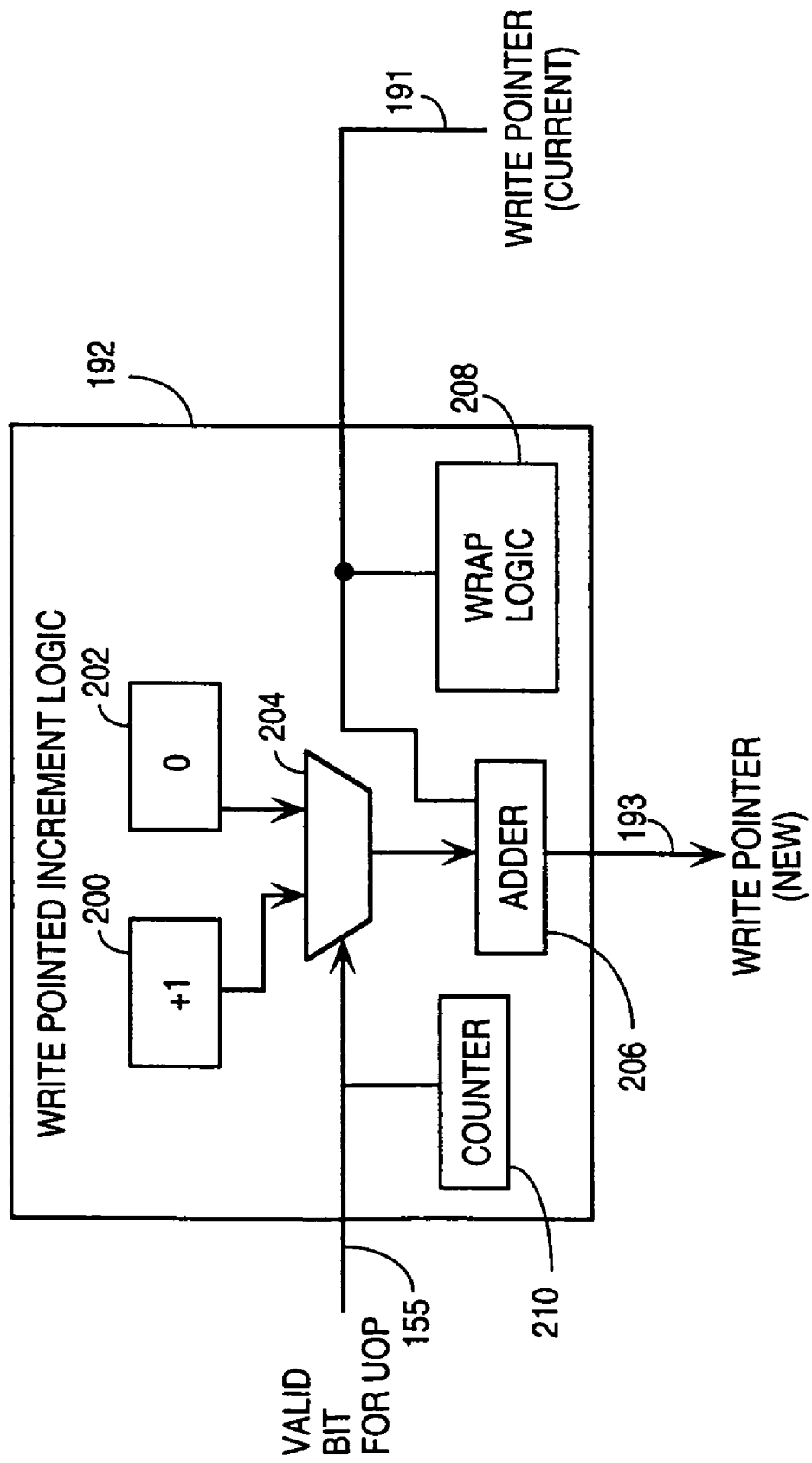
FIG. 8 is a block diagram showing a further level of architectural detail regarding write pointer increment logic included within the pointer logic illustrated in FIG. 7.

FIG. 8 is a block diagram showing further architectural details, according to an exemplary embodiment, of the write pointer increment logic 192. As illustrated, the logic 192 is show to receive a valid bit 155, associated with an entry of the queue identified by write pointer value 191, as input to a multiplexer (MUX) 204 that has an increment value 200 (e.g., a value of one (1)) and a non-increment value (e.g., a value of zero (0)) as inputs.

At decision block 248, the method 240 determines whether the valid bit 155 for the relevant microinstruction is set or not. Following a negative determination at decision block 248, the current write pointer is maintained at block 250.

Referring again specifically to FIG. 8, in the event that the valid bit 155 for the current microinstruction is set to 0, indicating a invalid microinstruction, the output of the MUX 204 is selected to be the non-increment value 202, which is propagated to an adder 206, that is the output of the MUX 204 to a current write pointer value 191. Accordingly, while considering an invalid microinstruction, the updated write pointer 193, outputted from the write pointer increment logic 192 to the write pointer logic 190, and assumed as the new current write pointer value 191, will remain unchanged.

On the other hand, if a positive outcome follows the determination at decision block 248, the method 240 proceeds to block 252, where the write pointer increment logic 192 operates to increment the write pointer value 191 to point to a subsequent entry of the queue 68.

Again referring to FIG. 8, should the valid bit 155 indicate a valid uop within the entry under consideration, the increment value 200 is inputted to the adder 206, which accordingly increments the current write pointer value 191 by the increment value 200 to generate an updated write pointer 193, which is adopted by the write pointer 190 as the current write pointer value 191. Accordingly, at block 252, the write pointer value 191 is incremented past a valid entry of the queue 68.

The write pointer increment logic 192 is also shown to include wrap logic 208, which serves to wrap the current pointer value 191 in the event that the pointer is advanced beyond the last entry of the queue 68.

At decision block 254, a determination is made as to whether there are any further microinstructions within the set written to the queue 68 at block 242 for which a valid bit has not been examined at decision block 248. To this end, the write pointer increment logic 192 may include a counter 210 that maintains a count corresponding to the number of instructions in each set written to the queue 68 from the trace cache 62. If it is determined that there are further microinstructions in the set to be examined, at block 256, the write pointer increment logic 192 proceeds to examine the valid bit 155 for the next microinstruction within the set as written to the queue 68. Following block 256, the method 240 then loops through blocks 248–256.

On the other hand, should it be determined at decision block 254 that there are no further blocks within the current set, the method 240 loops back to block 242, where the next set is read from the trace cache.

In summary, it will be appreciated that the method 240, by examining the valid bits associated with a set of microinstructions written to consecutive entries within the queue 68, proceeds to advance the write pointer to the entry following the last valid microinstruction in that set. Accordingly, the writing of a set of microinstructions into the queue 68 during a next write cycle will commence at either the end of the previous set where the previous set contained a full compliment of valid instructions, or commence to overwrite invalid entries of the queue 68 that were written to the queue 68 during the previous cycle. In this way, "bubbles" of invalid entries written into the queue within a first clock cycle are overwritten by microinstructions in a subsequent write cycle.

As mentioned above, the bypass path 160 may be utilized to bypass the queue 68 when the queue 68 is empty and where the allocator 76 is available to receive microinstructions. More specifically, in one exemplary embodiment, if the queue 68 is empty, microinstructions may be both propagated via the bypass path 160 and written into the queue 68. The exemplary embodiment may in this case employ two read pointers (not shown), one speculative that tracks what has been sent to the allocator 76 and one real that tracks what has been accepted by the allocator 76. When a microinstruction, or set of microinstructions, bypasses the queue 68 (and is written to the allocator 76), the speculative pointer is incremented. The real read pointer is only incremented when the allocator 76 signals to the pointer logic that it has received the relevant microinstruction(s). The speculative read pointer may have to be reset to the real read pointer when too many microinstructions have been sent to the allocator 76 via the bypass path 160.

Figure 10:
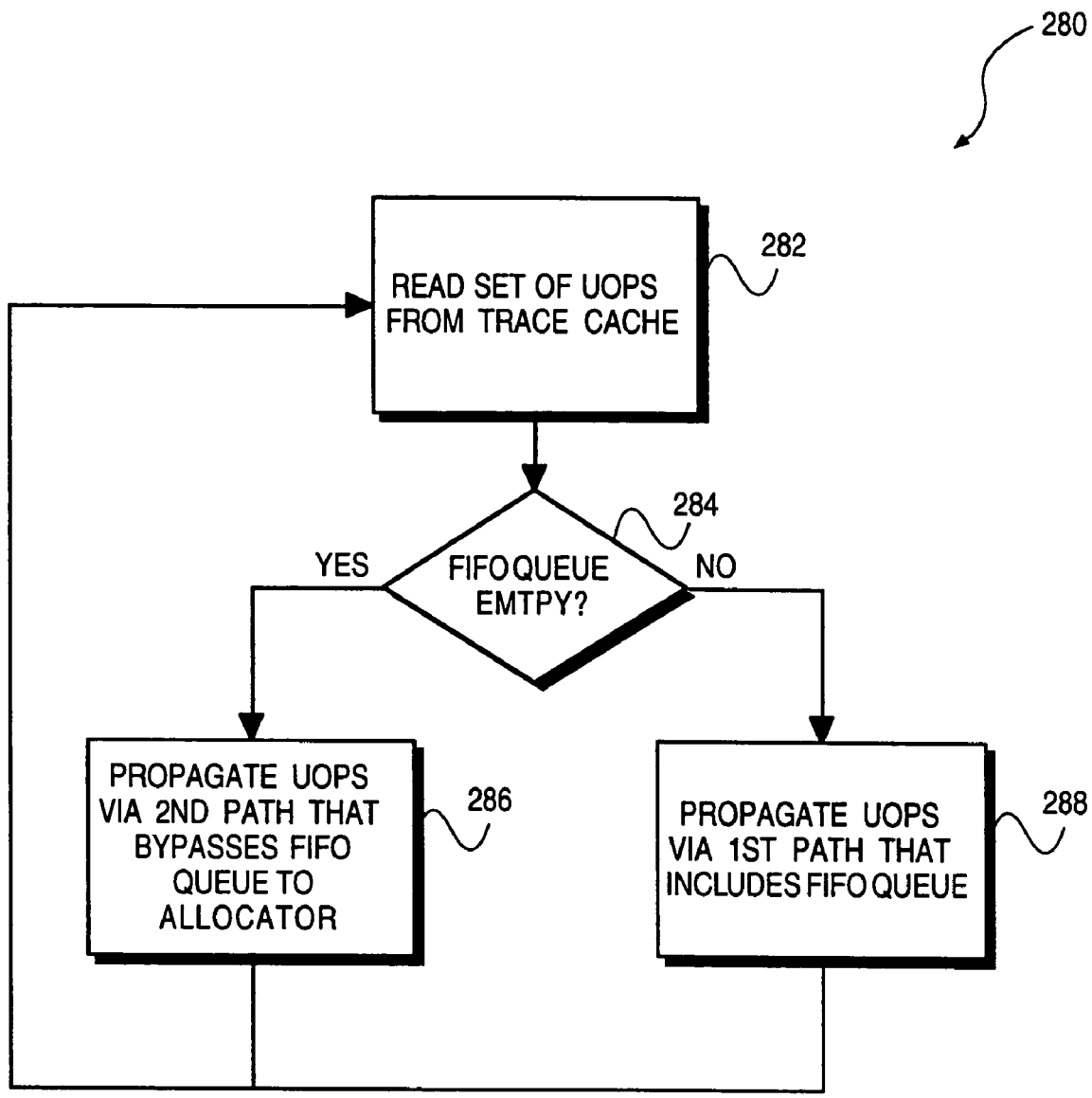
FIG. 10 is a flow chart illustrating a method, according to one embodiment of the present invention, of choosing between first and second paths between a source and destination, wherein a first path includes a buffering queue.

FIG. 10 is a flow chart illustrating an exemplary method 280, according to one embodiment of the present invention, of bypassing a buffer queue between a data source and a data target. The method 280 will be described below in the context of the microsequencer uop queue 68 but may, it will be appreciated, be applied to any buffering mechanism.

The method 280 commences at block 282 with the reading of a predetermined set of microinstructions (e.g., six microinstructions) from the trace cache 62 during a clock cycle of the first clock domain 172.

At decision block 284, a determination is made as to whether the queue 68 is empty. In an exemplary embodiment, this determination is made by compare logic 198, which is illustrated in FIG. 7 to be part of the pointer logic 170. Specifically, the compare logic 198 compares output values of the write pointer logic 190 and the read pointer logic 196 associated with the queue 68 to determine whether these pointer values indicate the same (or immediately adjacent) entries. If so, the compare logic 198 recognizes a queue empty condition, and asserts a queue empty signal 199.

Following a positive determination at decision block 284, the method 280 proposes propagating the microinstruction to the allocator 76 via the bypass path 160 that bypasses the queue 68. Specifically, both the queue 68 and bypass path 160 provide input to a MUX 162, which is operated by the queue empty signal 199 generated by the compare logic 198, to select between these two inputs as an output to the allocator 76. Upon assertion of the queue empty signal 199 by the compare logic 198, the MUX 162 selects the bypass path 160 as output from the MUX 162 and as input to the allocator 76.

On the other hand, following a determination at decision block 284 that the queue is not empty at 284, the relevant set of microinstructions is propagated to the allocator 76 via the queue 68. Otherwise, if the queue 68 is not empty, at block 288 the set of microinstructions is written into the queue 68, and will be read from the queue 68 upon reaching the head of the queue 68. It will be appreciated that in this situation, the queue empty signal 199 will not be asserted by the compare logic 198, and the microinstructions at the head of the queue 68 will be written to the allocator.

FIG. 11 is a block diagram illustrating an exemplary multi-threaded embodiment of the microsequencer uop queue 68 that is partitioned between at least two threads (e.g., T0 and T1). Each partition has associated pointer logic 170, including write pointer logic 190, a read pointer logic 194 and write pointer increment logic 192 that operates substantially as described above with reference to FIG. 7. In one embodiment, the queue 68 is shown to include ten sets, five of which are dedicated to a first thread (e.g., T0) and a further five which are dedicated to a second thread (e.g., T1). The respective pointer logic 170 operate to ensure that macroinstructions for a respective thread are only written to the sets of the queue 68 associated with the relevant thread.

FIG. 11 also shows each thread as receiving, potentially in parallel, microinstructions from the trace cache 62 that is also shown to be partitioned between the two threads. Each partition of the queue 68 furthermore outputs to a respective MUX 162, each of which also receives input from a respective bypass path 160.

While the components of the pointer logic 170, as discussed above, are shown and described to be implemented in combinational or discrete logic, it will readily be appreciated that the logic embedded within the pointer logic 170 may be implemented as a Floating Point Gate Array (FPGA), an Application Specific Integrated Circuit (ASIC) or as software. If the logic is implemented in software, it will be appreciated that this software may be stored on any medium from which a sequence of instructions embodying the software may be retrieved and executed by a machine (e.g., a processor). For purposes of this specification, the term "machine-readable medium" shall be taken to include any storage medium including, but not limited to, magnetic, optical, magneto-optical or solid state storage mediums.

While the above methods describe the determination of whether a particular entry within the queues 68 contains valid data or not as occurring as part of a first write operation, subsequent to the actual writing of the data and before commencement of a second, subsequent write operation it will be appreciated that the decision whether or not to advance the write pointer could also be made as part of the subsequent, second write operation, in which the determination as to whether to advance the write pointer or not is made as part of the second write operation, and prior to actually writing the data to the queue.

Further, the exemplary embodiment described above details a qualitative determination that is made with respect to each entry of a set of microinstructions written to the queue subsequent to the writing of that set to the queue. It will also be appreciated that the qualitative determination, as opposed to being applied across a set of microinstructions once written to the queue, could be performed with a lower resolution, and on a microinstruction by microinstruction basis. In other words, the qualitative determination may be made subsequent to writing each microinstruction to an entry within the queue 68.

Utilizing any one of the exemplary methodologies discussed above, and the exemplary apparatus, the present invention is advantageous in that it is effective in addressing the occurrence of "bubbles" of invalid entries within a queue. The occurrence of these "bubbles" may be addressed prior to rising to the head of the relevant queue. Thus, the present invention may lead to a more efficient utilization of the queue 68 by providing for a method of compacting the contents thereof.

Thus, a method and apparatus for writing to a queue have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method including:
   in a queue, writing a first microinstruction of a plurality of microinstructions from a trace to a first location indicated by a write pointer, the plurality of microinstructions from a trace being written to the queue as a set of a predetermined number of microinstructions, and the first microinstruction of the plurality of microinstructions includes one of a valid state and an invalid state, wherein the trace of microinstructions comprises a head entry, the head entry comprising a linear address to determine a set of subsequent entries in the trace;
   making a qualitative determination whether or not to retain the first microinstruction within the queue based on the state of the first microinstruction;
   if the first microinstruction includes the valid state then the qualitative determination is to retain the first microinstruction and the write pointer is advanced to indicate a second location within the queue into which to write a second microinstruction; and
   if the first microinstruction includes the invalid state then the qualitative determination is not to retain the first microinstruction and the write pointer is maintained to indicate the first location within the queue into which to write the second microinstruction, so that the first microinstruction is overwritten by the second microinstruction.

2. The method of claim 1 wherein the qualitative determination includes examining a valid bit associated with the first microinstruction to determine validity of the first microinstruction, making the qualitative determination to retain the first microinstruction if the valid bit indicates the first microinstruction is being valid, and making the qualitative determination not to retain the first microinstruction if the valid bit indicates the first microinstruction as being invalid.

3. The method of claim 2 wherein a plurality of microinstructions are written to the queue in a set of a predetermined number of microinstructions, and wherein at least one microinstruction of the set is indicated as being invalid on account of a branch misprediction relating to a branch microinstruction upstream of the at least one microinstruction in a stream of microinstructions.

4. The method of claim 1 wherein the first microinstruction is written to the queue from a microinstruction cache.

5. The method of claim 4 wherein the first microinstruction is part of a trace of microinstructions received from the microinstruction cache.

6. The method of claim 4 wherein the first microinstruction is received from a microinstruction source operating in a first clocking domain into the queue and read from the queue to a microinstruction destination operating in a second clocking domain.

7. The method of claim 1 wherein the first microinstruction is received into the queue as part of a set of microinstructions comprising a first predetermined number of microinstructions and read from the queue to a microinstruction destination as part of a second set of microinstructions comprising a second number of microinstructions.

8. The method of claim 1 wherein the first microinstruction is written from a source to a destination, and wherein the queue comprises a first path between source and destination, the method including propagating the first microinstruction from the source to the destination via a second path, not including the queue, if the queue is empty.

9. The method of claim 8 including selecting between the first and second paths to receive the first microinstruction for propagation to the destination.

10. The method of claim 1 wherein the queue includes a first portion to support a first thread within a multithreaded environment and a second portion to support a second thread within the multithreaded environment, and wherein the first location into which the first microinstruction is written is located in the first portion if the first microinstruction comprises part of the first thread.

11. Apparatus comprising:
a queue to buffer a first microinstruction propagated from a source to a destination, wherein the first microinstruction includes one of a valid state and an invalid state; and
write logic to make a qualitative determination whether or not to retain the first microinstruction within the queue based on the one of the valid state and the invalid state;
if the first microinstruction includes the valid state, then qualitative determination is to retain the first microinstruction and a write pointer is advanced indicate a second location within the queue into which to write a second microinstruction; and,
if the first microinstruction includes the invalid state, then the qualitative determination is not to retain the first microinstruction and the write pointer is maintained to indicate the first location within the queue into which to write the second microinstruction, so that the first microinstruction is overwritten by the second microinstruction;
wherein the first microinstruction is written to the queue as part of a set including a predetermined number of microinstructions, and wherein at least one microinstruction of the set is indicated as being invalid on account of being outside a trace of microinstructions, wherein the trace of microinstructions comprises a head entry, the head entry comprising a linear address to determine a set of subsequent entries in the trace.

12. The apparatus of claim 11 wherein the write logic is to examine a valid bit associated with the first microinstruction to determine validity of the first microinstruction, to make the qualitative determination to retain the first microinstruction if the valid bit indicates the first microinstruction as being valid, and to make the qualitative determination not to retain the first microinstruction if the valid bit indicates the first bit as being invalid.

13. The apparatus of claim 12 wherein the first microinstruction is written to the queue as part of a set of a predetermined number of microinstructions, and wherein at least one microinstruction of the set is indicated as being invalid on account of a branch misprediction relating to a branch microinstruction upstream of the at least one microinstruction in a stream of microinstructions.

14. The apparatus of claim 11 wherein the source from which the first microinstruction is written to the queue comprises a microinstruction cache.

15. The apparatus of claim 11 wherein the queue comprises a first path between the source and the destination, the apparatus including a second path between the source and destination, not including the queue, and wherein the write logic directs the first microinstruction to be propagated between the source and destination via the second path if the queue is empty.

16. A machine-readable medium storing a sequence of microinstructions that, when executed by a machine, cause the machine to perform the steps of:
in a queue, writing a first microinstruction of a plurality of microinstructions from a trace to a first location indicated by a write pointer, the plurality of microinstructions from a trace being written to the queue as a set of a predetermined number of microinstructions, and the first microinstruction of the plurality of microinstructions includes one of a valid state and an invalid state, wherein the trace of microinstructions comprises a head entry, the head entry comprising a linear address to determine a set of subsequent entries in the trace;
making a qualitative determination whether or not to retain the first microinstruction within the queue based on the state of the first microinstruction;
if the first microinstruction includes the valid state, then the qualitative determination is to retain the first microinstruction and the write pointer is advanced to indicate a second location within the queue into which to write a second microinstruction; and
if the first microinstruction includes the invalid state, the qualitative determination is not to retain the first microinstruction, then maintaining the write pointer to indicate the first location within the queue into which to write the second microinstruction, so that the first microinstruction is overwritten by the second microinstruction.

17. The machine-readable medium of claim 16 wherein the sequence of microinstructions cause a multiprocessor to perform the step of examining a valid bit associated with the first microinstruction to determine validity of the first microinstruction, to make the qualitative determination to retain the first microinstruction if the valid bit indicates the first microinstruction as being valid, and to make the qualitative determination not to retain the first microinstruction if the valid bit indicates the first microinstruction as being invalid.

* * * * *

UNITED STATES PATENT AND TRADEMARK OFFICE
CERTIFICATE OF CORRECTION

| | | |
|---|---|---|
| PATENT NO. | : 7,149,883 B1 | Page 1 of 1 |
| APPLICATION NO. | : 09/539734 | |
| DATED | : December 12, 2006 | |
| INVENTOR(S) | : Hammarlund et al. | |

It is certified that error appears in the above-identified patent and that said Letters Patent is hereby corrected as shown below:

In column 16, at line 62, before "the", insert --then--.

In column 16, at line 63, delete "then maintaining" and insert --and--.

In column 16, at line 64, before "to", insert --is maintained--.

Signed and Sealed this

Fifteenth Day of July, 2008

JON W. DUDAS
*Director of the United States Patent and Trademark Office*